United States Patent
Liberg et al.

(10) Patent No.: US 12,432,678 B2
(45) Date of Patent: Sep. 30, 2025

(54) RANDOM ACCESS HANDLING OF A UE

(71) Applicant: Telefonaktiebolaget LM Ericsson (publ), Stockholm (SE)

(72) Inventors: Olof Liberg, Enskede (SE); Anders Westergren, Karlstad (SE); Christian Skärby, Stockholm (SE); Fredrik Huss, Sundbyberg (SE); Sven Hellsten, Täby (SE); Tomas Svadling, Hammarö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 427 days.

(21) Appl. No.: 17/913,748

(22) PCT Filed: Dec. 18, 2020

(86) PCT No.: PCT/SE2020/051230
§ 371 (c)(1),
(2) Date: Sep. 22, 2022

(87) PCT Pub. No.: WO2021/201738
PCT Pub. Date: Oct. 7, 2021

(65) Prior Publication Data
US 2023/0100364 A1    Mar. 30, 2023

Related U.S. Application Data

(60) Provisional application No. 63/004,182, filed on Apr. 2, 2020.

(51) Int. Cl.
*H04W 74/08* (2024.01)
*H04W 56/00* (2009.01)
(Continued)

(52) U.S. Cl.
CPC ... *H04W 74/0833* (2013.01); *H04W 56/0045* (2013.01); *H04W 74/002* (2013.01)

(58) Field of Classification Search
CPC ......... H04W 74/0833; H04W 56/0045; H04W 74/002; H04W 74/008; H04W 74/00;
(Continued)

(56) References Cited

U.S. PATENT DOCUMENTS

2020/0077446 A1\* 3/2020 Agiwal ............. H04W 74/0833
2021/0029658 A1\* 1/2021 Mahalingam ........ H04B 7/1851
(Continued)

FOREIGN PATENT DOCUMENTS

WO    2019195457 A1    10/2019
WO    2019231305 A1    12/2019

OTHER PUBLICATIONS

Mediatek Inc., "New Study WID on NB-IoT/eTMC support for NTN", 3GPP TSG RAN Meeting #86, Sitges, Spain, Dec. 9, 2019, pp. 1-4, RP-193235, 3GPP.
(Continued)

*Primary Examiner* — Ricky Q Ngo
*Assistant Examiner* — Meheret Woldegebreal Kidane
(74) *Attorney, Agent, or Firm* — COATS & BENNETT, PLLC

(57) ABSTRACT

There is provided mechanisms for random access handling of a UE. A method is performed by a network node. The method comprises receiving, from the UE during a first RAO, a first RA preamble, whilst refraining from responding to the first RA preamble. The method comprises transmitting, towards the UE and without the network node first having received any retransmitted RA preamble from the UE, one RAR for each of N possible RA preambles, where each RAR comprises a TA command corresponding to a TA value estimated for the first RA preamble. The method
(Continued)

comprises receiving, from the UE during a further RAO, a retransmitted RA preamble. The method comprises determining whether the TA value for the retransmitted RA preamble matches the TA value for the first RA preamble or not.

36 Claims, 8 Drawing Sheets

(51) Int. Cl.
 *H04W 74/00* (2009.01)
 *H04W 74/0833* (2024.01)
(58) Field of Classification Search
 CPC .... H04W 56/00; H04W 74/08; H04B 7/1851; H04B 7/185
 USPC .......................................................... 370/329
 See application file for complete search history.

(56) References Cited

U.S. PATENT DOCUMENTS

2021/0051725 A1* 2/2021 Tang ................. H04W 74/0833
2022/0394648 A1* 12/2022 Lin ................... H04W 56/0045

OTHER PUBLICATIONS

3rd Generation Partnership Project, "3rd Generation Partnership Project; Technical Specification Group Radio Access Network; Solutions for NR to support non-terrestrial networks (NTN) (Release 16)", Technical report, 3GPP TR 38.821 V16.0.0, Dec. 1, 2019, pp. 1-140, 3GPP, France.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 15)", Technical Specification, 3GPP TS 36.331 V15.0.0, Dec. 1, 2017, pp. 1-735, 3GPP, France.

Thales, "Solutions for NR to support non-terrestrial networks (NTN)", 3GPP TSG RAN meeting #86, Sitges, Spain, Dec. 9, 2019, pp. 1-10, RP-193234, 3GPP.

3rd Generation Partnership Project, "3rd Generation Partnership Project; Technical Specification Group Radio Access Network; Study on New Radio (NR) to support non-terrestrial networks (Release 15)", Technical Report, 3GPP TR 38.811 V15.2.0, Sep. 1, 2019, pp. 1-126, 3GPP, France.

Oppo, "Left issues on random access procedure in NTN", 3GPP TSG-RAN WG2 Meeting #107bis, Chongqing, China, Oct. 14, 2019, pp. 1-5, R2-1913335, 3GPP.

Zte et al., "Report of Email Discussion [106#70] [NRNTN] RACH capacity/procedures", 3GPP TSG-RAN WG2 Meeting #107, Prague, Czech, Aug. 26, 2019, pp. 1-38, R2-1909256, 3GPP.

Nokia, et al., "Doppler Compensation, Uplink Timing Advance and Random Access in NTN", 3GPP TSG RAN WG1 Meeting #97, Reno, US, May 13, 2019, pp. 1-13, R1-1906087, 3GPP.

Nokia, et al., "Considerations on Timing Advance and Random Access for NTN", 3GPP TSG RAN WG1 Meeting #93, Busan, Korea, May 21, 2018, pp. 1-4, R1-1806768, 3GPP.

Interdigital Inc., et al., "Considerations on Timing Advance for NTN", 3GPP TSG RAN WG1 Meeting #92bis, Sanya, China, Apr. 16, 2018, pp. 1-3, R1-1804858, 3GPP.

3rd Generation Partnership Project, "3rd Generation Partnership Project; Technical Specification Group Radio Access Network; 5GS; User Equipment (UE) conformance specification; Part 1: Protocol (Release 16)", Technical Specification, 3GPP TS 38.523-1 V16.3.0, Mar. 2020, pp. 1-798, 3GPP.

\* cited by examiner

RANDOM ACCESS HANDLING OF A UE

TECHNICAL FIELD

Embodiments presented herein relate to a method, a network node, a computer program, and a computer program product for random access handling of a user equipment (UE).

BACKGROUND

In communications networks, there may be a challenge to obtain good performance and capacity for a given communications protocol, its parameters and the physical environment in which the communications network is deployed.

The Evolved Packet System (EPS) is based on the Long-Term Evolution (LTE) radio network and the Evolved Packet Core (EPC). It was originally intended to provide voice and mobile broadband (MBB) services but has continuously evolved to broaden its functionality.

The 5G system (5GS) is a new generation radio access technology intended to serve use cases such as enhanced mobile broadband (eMBB), ultra-reliable and low latency communication (URLLC) and massive machine-type communications (mMTC) services. The 5GS includes the so-called New Radio (NR) access stratum interface and the 5G Core Network (5GC). The NR physical and higher layers are reusing parts of those utilized in the LTE network, and to that add needed components when motivated by new use cases. One such component is the introduction of a framework for beam forming and beam management to extend the support of the radio technologies to a frequency range going beyond 6 GHz.

In order to establish an operational connection to the network, regardless if the network is based on LTE or 5GS, a UE performs a random access procedure. An example random access procedure is illustrated in the signalling diagram of FIG. 1 and starts with the UE transmitting a random access (RA) preamble in a physical random access channel (for short hereinafter referred to as a PRACH preamble, or RA preamble) in a random access opportunity (RAO). Which RA preamble to use is dependent on system information received from the network. The network, as represented by a network node (NN), responds to the UE using the random access response (RAR), which e.g. contains a random access preamble identifier (RAPID) and a timing advance (TA) command which facilitates uplink (UL) synchronization. This allows the network to estimate timing of the UE, thus enabling timing alignment.

Taking an LTE network as an example, the random access procedure is configured using information broadcasted in system information block 2 (SIB2). The configuration includes e.g. the number of RA preambles available for the UE at each RAO, the periodicity P by which a RAO appears and the length of the RAR window during which a UE can expect to receive the RAR. The UE expects to receive a RAR in the RAR window starting from the third subframe, i.e. k=3 in FIG. 1, after the subframe where the RA preamble is transmitted. The RAR window can be configured with a length up to 10 ms. If the UE does not receive a RAR within the RAR window, the UE will randomly select a new RA preamble and transmit the new RA preamble in a subsequent RAO.

A satellite radio access network is one example of a Non-Terrestrial Network (NTN). In an NTN, the UE is served by one or more communication satellites. Due to the much larger geographical distance between the UE and the communication satellite, compared to the geographical distance between the UE and a terrestrial based base station, it might be challenging to successfully establish an operational connection to the network if the above disclosed random access procedure is used between the communication satellite and the UE.

Hence, there is still a need for improved random access procedures.

SUMMARY

An object of embodiments herein is to provide efficient random access handling of a UE that does not suffer from the issues noted above, or at least where the above noted issues have been mitigated or reduced.

According to a first aspect there is presented a method for random access handling of a UE. The method is performed by a network node. The method comprises receiving, from the UE during a first RAO, a first RA preamble, whilst refraining from responding to the first RA preamble. The method comprises transmitting, towards the UE and without the network node first having received any retransmitted RA preamble from the UE, one RAR for each of N possible RA preambles, where each RAR comprises a TA command corresponding to a TA value estimated for the first RA preamble. The method comprises receiving, from the UE during a further RAO, a retransmitted RA preamble. The method comprises determining whether the TA value for the retransmitted RA preamble matches the TA value for the first RA preamble or not.

According to a second aspect there is presented a network node for random access handling of a UE. The network node comprises processing circuitry. The processing circuitry is configured to cause the network node to receive, from the UE during a first RAO, a first RA preamble, whilst refraining from responding to the first RA preamble. The processing circuitry is configured to cause the network node to transmit, towards the UE and without the network node first having received any retransmitted RA preamble from the UE, one RAR for each of N possible RA preambles, where each RAR comprises a TA command corresponding to a TA value estimated for the first RA preamble. The processing circuitry is configured to cause the network node to receive, from the UE during a further RAO, a retransmitted RA preamble. The processing circuitry is configured to cause the network node to determine whether the TA value for the retransmitted RA preamble matches the TA value for the first RA preamble or not.

According to a third aspect there is presented a network node for random access handling of a UE. The network node comprises a receive module configured to receive, from the UE during a first RAO, a first RA preamble, whilst refraining from responding to the first RA preamble. The network node comprises a transmit module configured to transmit, towards the UE and without the network node first having received any retransmitted RA preamble from the UE, one RAR for each of N possible RA preambles, where each RAR comprises a TA command corresponding to a TA value estimated for the first RA preamble. The network node comprises a receive module configured to receive, from the UE during a further RAO, a retransmitted RA preamble. The network node comprises a determine module configured to determine whether the TA value for the retransmitted RA preamble matches the TA value for the first RA preamble or not.

According to a fourth aspect there is presented a computer program for random access handling of a UE, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously these aspects provide efficient random access handling of the UE.

Advantageously these aspects do not suffer from the issues noted above.

Advantageously these aspects provide support of a backwards compatible random access procedure in an LTE network configured for satellite communication.

Advantageously these aspects do not require the random access procedure at the UE side to be modified.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 2:
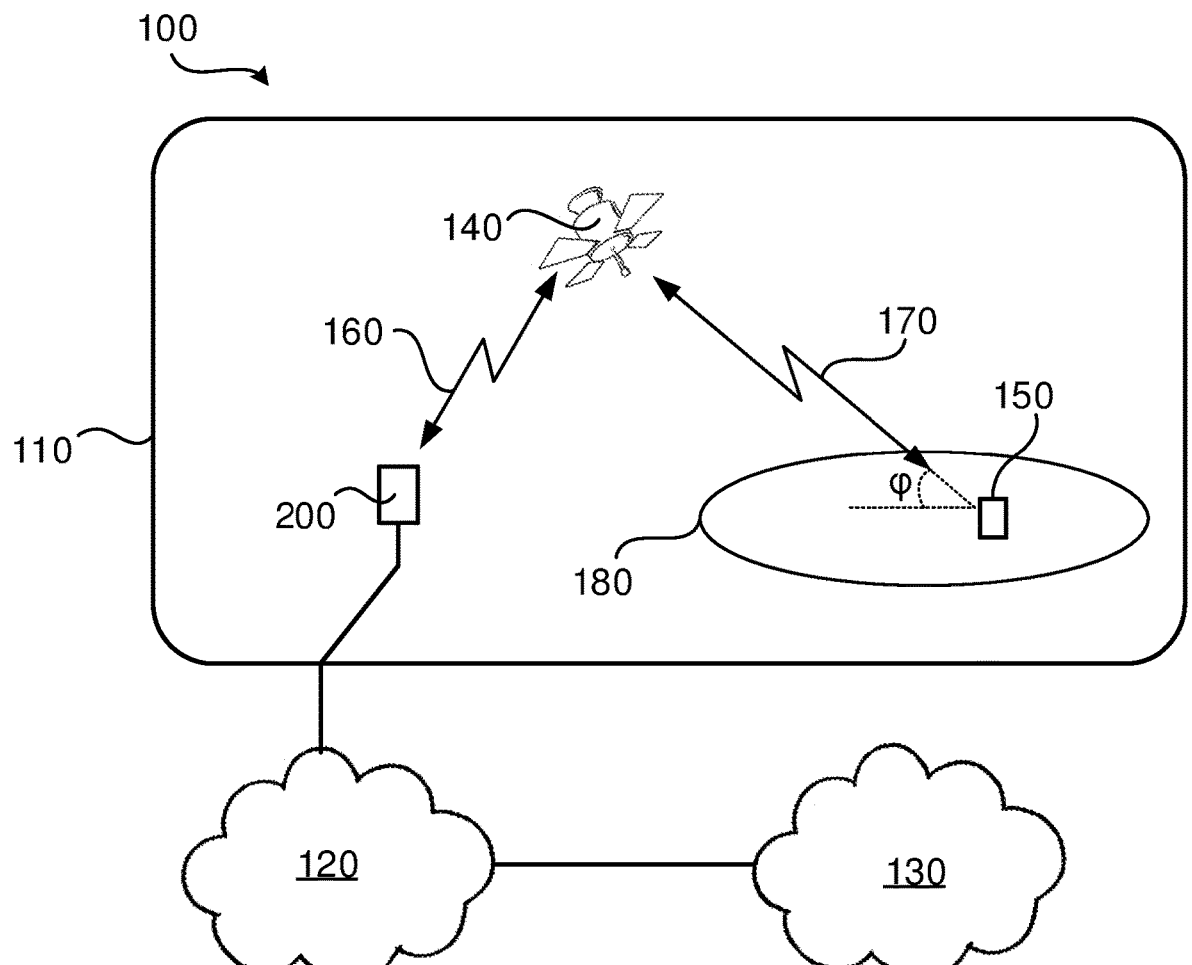
FIG. 2 is a schematic diagram illustrating a communications network according to embodiments.

FIG. 2 is a schematic diagram illustrating a communications network 100 where embodiments presented herein can be applied. The communications network 100 comprises a radio access network 110. In some aspects, the radio access network is an NTN network. The radio access network 110 comprises an NTN node 140 in the form of an earth-orbiting communication satellite. In this respect the term communication satellite refers to a space-borne communication platform. The radio access network 110 further comprises an earth-based network node 200 acting as a gateway and that operatively connects the communication satellite to a base station or a core network 120, depending on the choice of architecture. The communication satellite communicates over a feeder link 160 that refers to the link between the network node 200 and the communication satellite, and a service link 170 that refers to the link between the communication satellite and a UE 150. Depending on the orbit altitude, the communication satellite may be categorized as low earth orbit (LEO), medium earth orbit (MEO), or geostationary earth orbit (GEO) satellite. The radio access network 110 is operatively connected to a core network 120. The core network 120 is in turn operatively connected to a service network 130, such as the Internet. The UE 150 is thereby enabled to, via the communication satellite and the network node 200, access services of, and exchange data with, the service network 130.

The network node 200 might be part of, integrated with, or collocated with, a gateway, radio access network node, radio base station, base transceiver station, node B (NB), evolved node B (eNB), gNB, access point, transmission and reception point, integrated wireless accesses and backhaul node, or the like.

The UE 150 might be part of, integrated with, or collocated with, a portable wireless device, mobile station, mobile phone, handset, wireless local loop phone, user, smartphone, laptop computer, tablet computer, network equipped vehicle, wireless sensor, or the like.

The communication satellite might be configured to generate one or more beams over a given area for communications with the UE 150. In FIG. 2, the beam is represented by its terrestrial footprint 180. The terrestrial footprint 180 of such a beam is commonly in an elliptic, or circular, shape, which traditionally was considered as a cell. The terrestrial footprint 180 is also referred to as a spotbeam. The terrestrial footprint 180 may move over the earth surface with the communication satellite movement or may be earth-fixed with some beam pointing mechanism used by the communication satellite to compensate for its motion. The size of the spotbeam, and thus of the terrestrial footprint 180, depends on system design and may range from tens of kilometers to a few thousands of kilometers.

The depicted elevation angle $\varphi$ of the service link 170 (as well as the velocity of the communication satellite relative to the UE 150) affects the distance and round-trip time (RTT) between the communication satellite and the UE 150.

Propagation delay is a physical phenomenon in any satellite communication system that makes the radio access network design different from that of a terrestrial mobile system. The RTT will depend on the NTN architecture used. For a bent pipe satellite network, the one-way delay is defined as the delay from the network node 200 to the UE 150 via the communication satellite, or the other way around, and the round-trip delay is defined as the delay from the network node 200 to the UE 150 via the communication satellite and from the UE 150 back to the network node 200 via the communication satellite. For a regenerative satellite network, the one-way delay is defined as the delay from the UE 150 to the communication satellite, or the other way around, and the round-trip delay is defined as the delay from the UE 150 to the communication satellite and back to the UE 150, or the other way around.

There may be additional delays between the ground antenna and the network node 200, which may or may not be collocated. This delay depends on deployment. If the delay cannot be ignored, it should be taken into account in the system design.

As noted above there is a need for improved random access procedures due to the delays observed in the above mentioned NTNs.

In this respect, the existing random access procedures at the physical (PHY) and media access control (MAC) protocol layers have been designed for terrestrial networks where the round-trip propagation delay is restricted to be within 1 ms. This is indicated in above referred FIG. 1 in that the transmission and reception of a physical channel or signal occur within the same subframe.

According to the values presented in Table 5.3.4.1-1 of 3GPP TR 38.811 "Study on New Radio (NR) to support non-terrestrial networks", version 15.2.0, the exemplified round-trip delays, which apply at an elevation angle $\varphi$ of 90 degrees, are much larger in an NTN compared with a terrestrial based communication network. At lower elevation angles the delays further increase.

Figure 1:
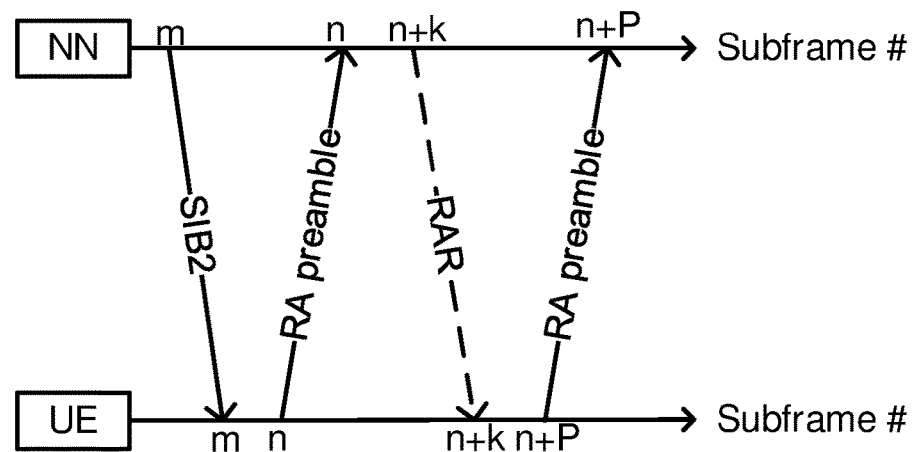
FIG. 1 is a signalling diagram of part of a random access procedure for which the RA preamble is transmitted once.
Figure 3:
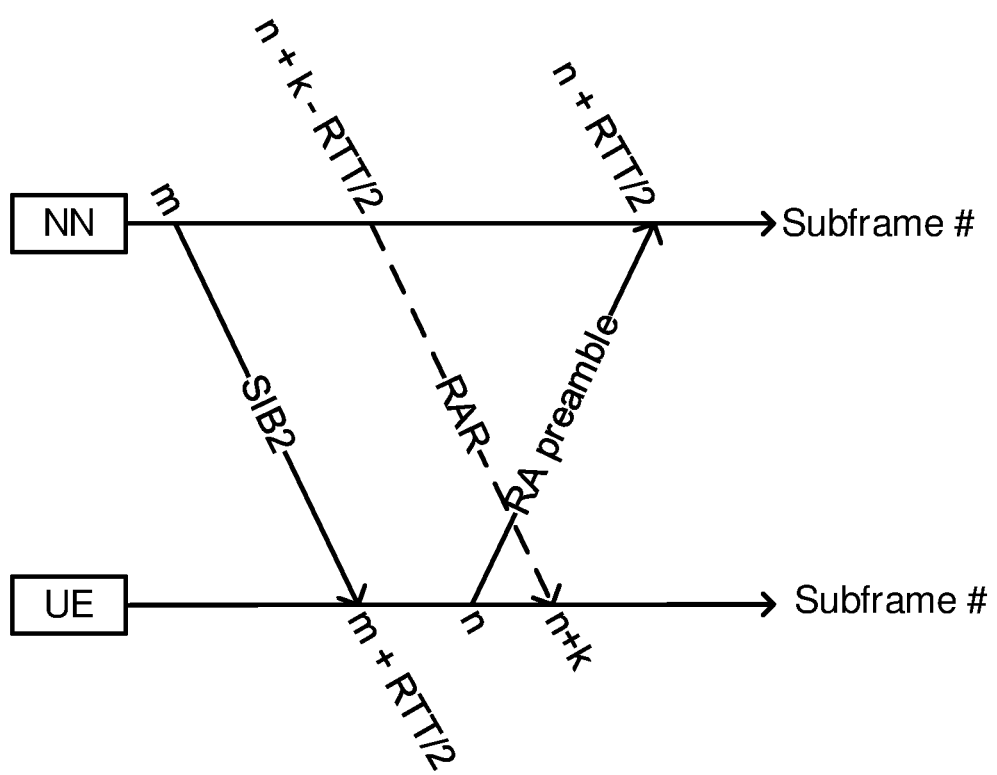
FIG. 3 is a signalling diagram of a random access procedure according to an embodiment.

Thus, if the random access procedure of FIG. 1 is used without any modifications, this would imply that the RAR needs to be transmitted before the RA preamble is received so that the RAR is not received too late by the UE 150. This is illustrated in the signalling diagram of FIG. 3. FIG. 3 illustrates the aforementioned random access procedure as adapted according to the needed requirements of the large RTT expected in an NTN with a non-geostationary (NGSO) communication satellite. It is seen in FIG. 3 that the reception of a transmission is delayed by RTT/2 relative its transmission point. Furthermore, for a UE 150 to receive the RAR starting from k=3 subframes after its RA preamble transmission, the network node 200 needs to transmit the RAR well before the RA preamble was even transmitted by the UE 150. As the RAR should indicate the RAPID and comprise a TA command, where both the RAPID and the TA command are based on the reception of the RA preamble, this is not possible based on known usage of the RA procedure. Hence, the random access procedure of FIG. 3 will not work without further modifications of the known usage.

The embodiments disclosed herein therefore relate to mechanisms for random access handling of a UE 150. In order to obtain such mechanisms there is provided a network node 200, a method performed by the network node 200, a computer program product comprising code, for example in the form of a computer program, that when run on a network node 200, causes the network node 200 to perform the method.

Figure 4:
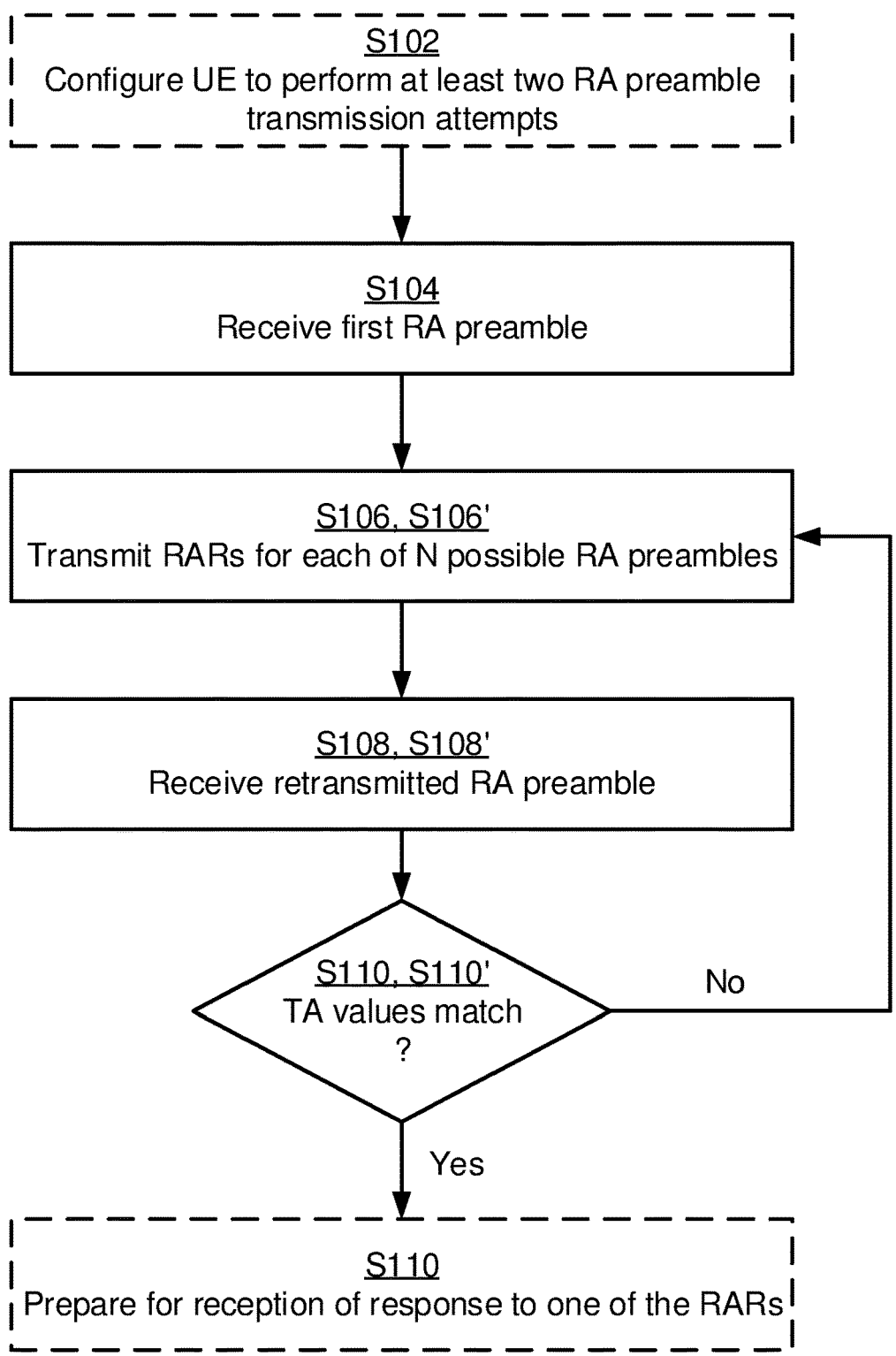
FIG. 4 is a flowchart of methods according to embodiments.

FIG. 4 is a flowchart illustrating embodiments of methods for random access handling of a UE 150. The methods are performed by the network node 200. The methods are advantageously provided as computer programs 920.

It is assumed that the UE 150 transmits a RA preamble and that this RA preamble is received by the network node 200. Hence, the network node 200 is configured to perform step S104:

S104: The network node 200 receives, from the UE 150 during a first RAO, a first RA preamble, whilst refraining from responding to the first RA preamble.

The network node 200 thus refrains from responding to the first RA preamble. This implies that the first RA preamble is received by the network node 200 without the network node 200 responding to the first RA preamble. In some aspects, receiving the first RA preamble involves the network node 200 to estimate a TA value for the first RA preamble.

The network node 200 then transmits a RAR towards the UE 150. This RAR, however, is not for the first RA preamble, but for an anticipated retransmitted RA preamble. Hence, the network node 200 is configured to perform step S106:

S106: The network node 200 transmits, towards the UE 150 and without the network node 200 first having received any retransmitted RA preamble from the UE 150, one RAR for each of N possible RA preambles. Each RAR comprises a TA command corresponding to a TA value estimated for the first RA preamble.

It is then assumed that the retransmitted RA preamble is received from the UE 150. Hence, the network node 200 is configured to perform step S108:

S108: The network node 200 receives from the UE 150 during a further RAO, a retransmitted RA preamble.

In some aspects, receiving the retransmitted RA preamble involves the network node 200 to estimate a TA value for the retransmitted RA preamble.

The TA value estimated for the retransmitted RA preamble is then compared to the TA value estimated for the first RA preamble. Hence, the network node 200 is configured to perform step S110:

S110: The network node 200 determines whether the TA value for the retransmitted RA preamble matches the TA value for the first RA preamble or not.

The network node 200 thereby responds to the retransmitted RA preamble without first having received the same, and then checks whether the TA of the retransmitted RA preamble (once received) is the same as for the first RA preamble or not.

This provides support of a backwards compatible configuration of the random access procedure in an LTE network configured for satellite communication.

Embodiments relating to further details of random access handling of a UE 150 as performed by the network node 200 will now be disclosed.

In some aspects, since the network node 200 refrains from responding to the first RA preamble, the UE 150 needs to be explicitly configured for retransmission of the RA preamble. In particular, in some embodiments the network node 200 is configured to perform (optional) step S102:

S102: The network node 200 configures the UE 150 to perform at least two RA preamble transmission attempts.

This configuration takes place before the UE 150 transmits the first RA preamble and the configuration might be transmitted by the network node 200 over a broadcast channel or control channel so that the information can be received by the UE 150 before the UE 150 transmits the first RA preamble.

There could be different ways for the network node 200 to transmit the RARs. In some embodiments, all the RARs are transmitted in a common medium access control (MAC) layer protocol data unit (PDU). That is, all the RARs as transmitted in step S106 might thus be transmitted in one and the same MAC PDU.

In some aspects, the number N of RA preambles supported per RAO is limited so that a single MAC PDU can contain RARs for all N RA preambles. That is, in some embodiments N<64, preferably N≤32, still preferably N≤16, still preferably N≤8, still preferably N=4. This might involve configuring the SIB2 numberOfRA-Preambles information element (IE) to this value of N.

There could be different ways for the RARs to be indicated. In some embodiments, each RAR is indicated by a RAPID corresponding to one unique RA preamble among the N possible RA preambles.

In some aspects, the RAR window is configured to its maximum length of 10 ms. The maximum length maximizes the supported RTT. This might involve configuring the the ra-ResponseWindowSize IE to this value of the RAR window.

Figure 5:
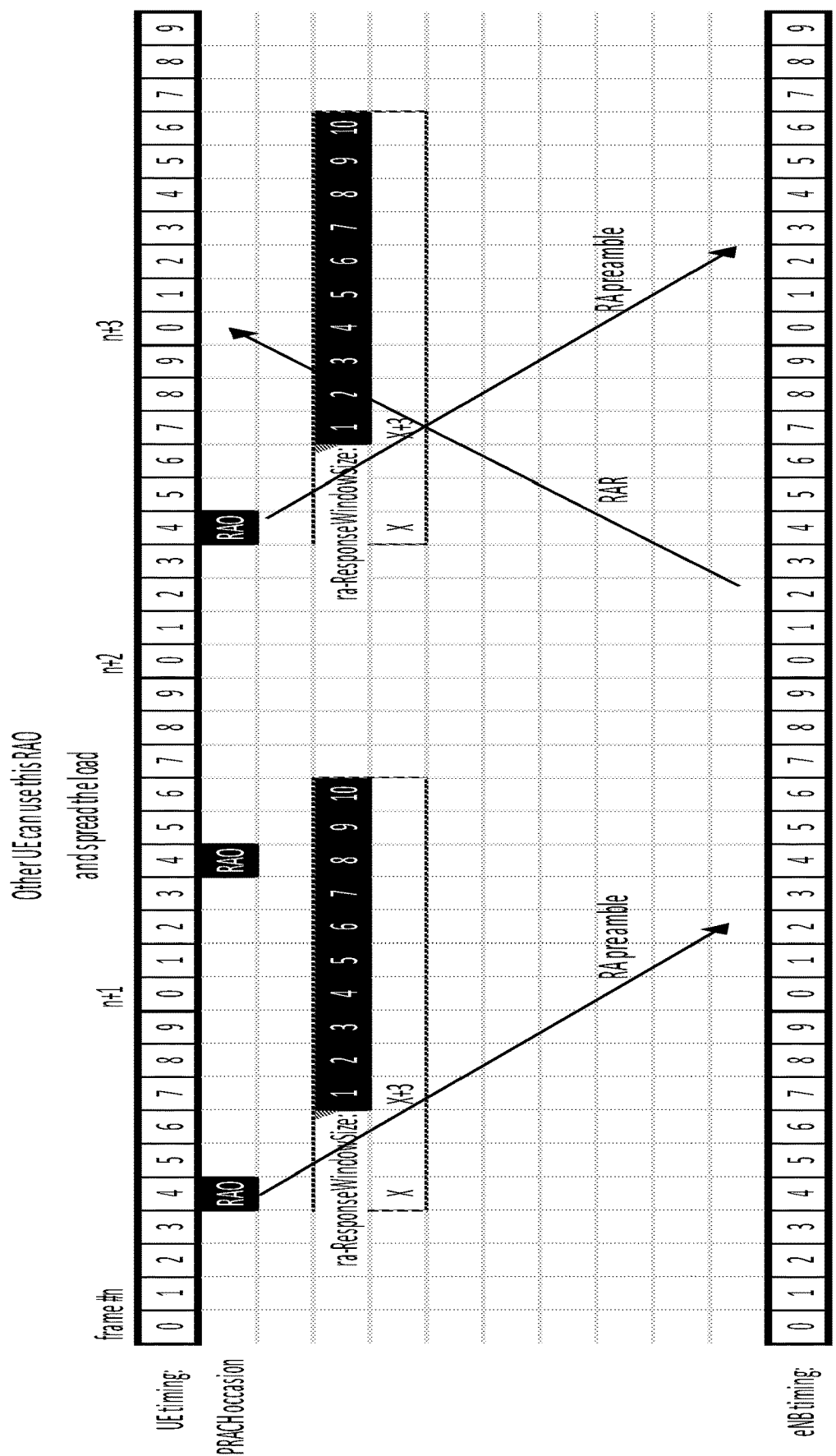
FIG. 5 schematically illustrates how RAO periodicity affect the collision avoidance according to an embodiment.

In some aspects, the RAO periodicity is configured to its maximum allowed periodicity of 20 ms. The maximum length maximizes the supported RTT. This might involve configuring the prach-ConfigIndex IE with this value of the RAO periodicity. Alternative, the RAO periodicity can be selected to a value that is lower than, or equal to, ra-ResponseWindowSize+3 ms to minimize collisions from different UEs. Using for example a RAO periodicity of 10 ms gives the possibility for different UEs to use different RAOs whilst minimizing the risk of collision. This is illustrated in FIG. 5 to which parallel reference now is made. FIG. 5 schematically illustrates, in terms of subframes, how the RAO periodicity affects the collision avoidance. FIG. 5 shows an example with ra-ResponseWindowSize=10 ms (i.e., with a RAR window of duration 10 ms) and prach-ConfigIndex=4 (corresponding to a RAO period of 10 ms).

There could be different points in time in which the RARs in step S106 are transmitted. In some aspects there is a latest point in time when the RARs in step S106 need to be transmitted. In some embodiments the RARs are transmitted at latest x subframes before end of the RAR window for the UE 150, where x is equal to half of the TA value estimated for the first RA preamble. This enables the RARs to be received by the UE 150 no later than at the end of the configured RAR window associated with the later RAO.

In some aspects, the MAC PDU is transmitted in a data channel, such as a physical downlink shared channel (PDSCH), which is scheduled by a control channel, such as a physical downlink control channel (PDCCH) with a cyclic redundancy check (CRC) code scrambled by a random access radio network temporary identifier (RA-RNTI) associated with the transmission timing of the retransmitted RA preamble.

As disclosed above, the network node 200 in step S110 determines whether the TA value for the retransmitted RA preamble matches the TA value for the first RA preamble or not. There are thus two outcomes of this determination; either the TA value for the retransmitted RA preamble does indeed matches the TA value for the first RA preamble, or the TA value for the retransmitted RA preamble does not match the TA value for the first RA preamble.

In some aspects, when there indeed is a match between these TA values, the network node 200 prepares for reception of Msg3 from the UE 150. That is, in some embodiments, the network node 200 is configured to, only upon having confirmed that the TA value for the retransmitted RA preamble matches the TA value for the first RA preamble, perform (optional) step S112:

S112: The network node 200 prepares for reception from the UE 150 of a response to one of the RARs.

In some aspects, when there is not a match between these TA values, the network node 200 stores the TA value for the retransmitted RA preamble and transmits a new set of RARs for this TA value. That is, in some embodiments, when the TA value for the retransmitted RA preamble does not match the TA value for the first RA preamble, the transmitting in step S106, the receiving in step S108, and the determining in step S110 are repeatedly performed for further retransmitted preambles, further TA values, and further RAOs, until a criterion is fulfilled.

In this respect, since the network node 200 might receive RA preambles from more than one UE 150, the criterion is applied per UE 150. The herein disclosed embodiments are not limited to from how many UEs 150 RA preambles are received from.

In further detail, in some embodiments, the network node 200 is configured to perform the transmitting in step S106, the receiving in step S108, and the determining in step S110 by repeatedly performing these steps but for further retransmitted preambles, further TA values, and further RAOs, as in steps S106', S108', and S110':

S106': The network node 200 transmits, towards the UE 150 and without the network node 200 first having received any further retransmitted RA preamble from the UE 150, one RAR for each of the N possible RA preambles, where each RAR comprises a TA command corresponding to a TA value estimated for the retransmitted RA preamble.

S108': The network node 200 receives, from the UE 150 and during a yet further RAO, a further retransmitted RA preamble.

S110': The network node 200 determines whether the TA value for the further retransmitted RA preamble matches the TA value for the retransmitted RA preamble or not.

There could be different types of criteria. In some aspects, the criterion is fulfilled when a matching pair of TA values is found or a fixed number of iterations has been reached. That is, in some embodiments, the criterion is fulfilled by either that there is a match between two recent-most TA values, or that the transmitting in steps S106, S106', the receiving in steps S108, S108', and the determining in step S108, S108' have been repeatedly performed for a fixed number of iterations. In some non-limiting examples, the fixed number of iterations takes a value between 5 and 15. In some non-limiting examples, the fixed number of iterations is equal to 10.

As disclosed above with reference to FIG. 2, in some aspects the UE 150 is served by the network node 200 via an NTN node 140. Hence, in some embodiments, the first RA preamble and the retransmitted RA preamble are received from the UE 150 via the NTN node 140. Likewise, in some embodiments, the RARs are transmitted towards the UE 150 via the NTN node 140. As further disclosed above with reference to FIG. 2, in some examples the NTN node 140 is an earth-orbiting communication satellite.

Figure 6:
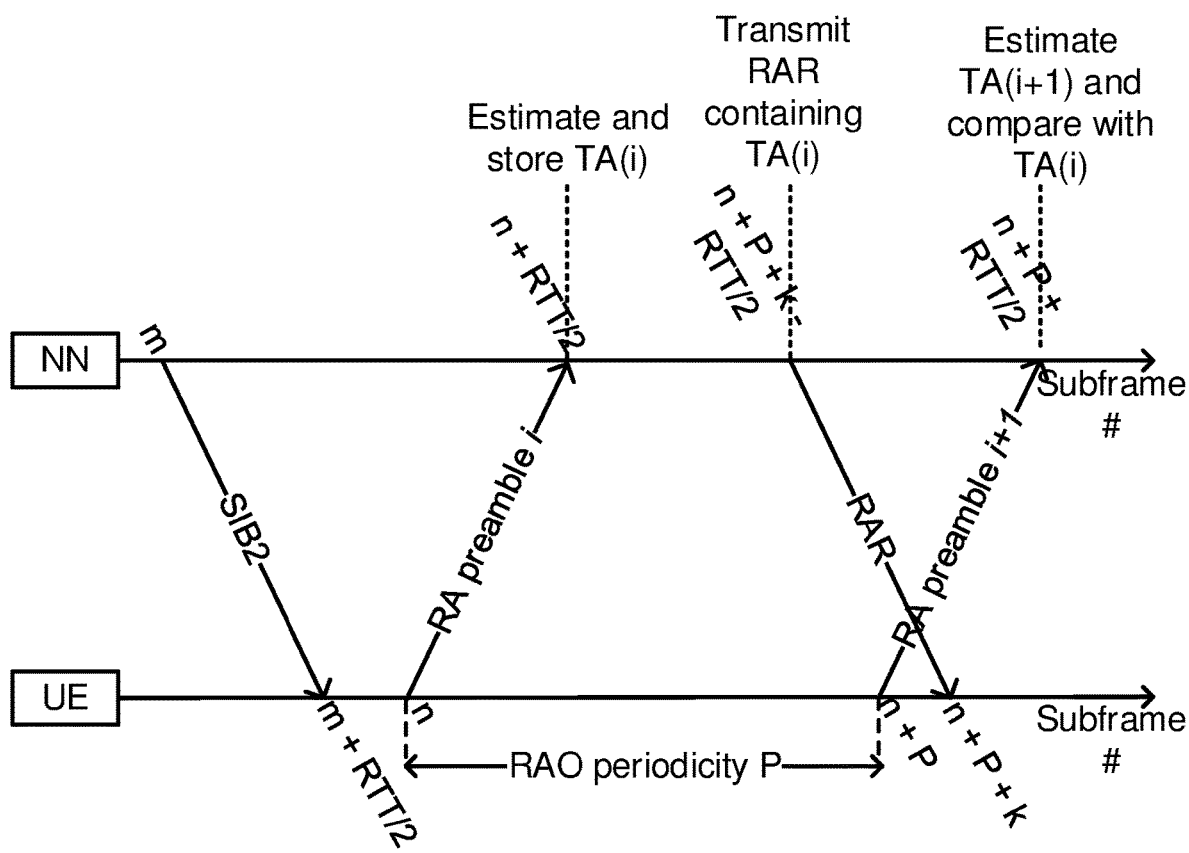
FIG. 6 is a signalling diagram of a random access procedure according to an embodiment.

Reference is now made to the signalling diagram of FIG. 6 that corresponds to the methods disclosed above with reference to FIG. 4.

The UE 150 transmits a first RA preamble. The RA preamble is assumed to be received by the network node 200 in a first RAO. The network estimates a TA value from the first RA preamble. The network node 200 refrains from responding to the reception of the first RA preamble and instead temporarily stores the TA value. This is done since the network node 200 awaits a retransmitted RA preamble from the UE 150 in a later RAO.

The network node 200 then, before receiving any such retransmitted preamble, transmits a MAC PDU so that it this MAC PDU is received by the UE 150 no later than at the end of the configured RAR window associated with the later RAO. The MAC PDU is configured to comprise one RAR for each of the N possible RA preambles. Each RAR is indicated by a RAPID corresponding to one unique RA preamble among the N possible RA preambles. Each of the RARs comprises a TA command corresponding to the stored TA value as estimated based the recent-most received RA preamble.

It is assumed that, due to the lack of a timely RAR, the UE 150 retransmits a new RA preamble that is received by the network node 200 in a later RAO. The network node 200 estimates a further TA value from the thus retransmitted RA preamble.

The network node 200 then compared the further TA value to the previous TA value.

If there is a match (with a satisfying accuracy) between the further TA value and the previous TA value, the network node 200 prepares for reception of Msg3, which refers to the UEs 150 response to the RAR as configured by the RAR.

If there is not any match (with a satisfying accuracy) between the further TA value and the previous TA value, the previous TA value is discarded, the further TA value is regarded as the previous TA value, and transmits a further MAC PDU with further RARs as disclosed above and the awaits reception of a further new RA preamble from the UE 150 from which a new further TA value is estimated. This new further TA value is compared to the previous TA value. This can be repeated until there is a match or until a fixed number of iterations has been reached.

Figure 7:
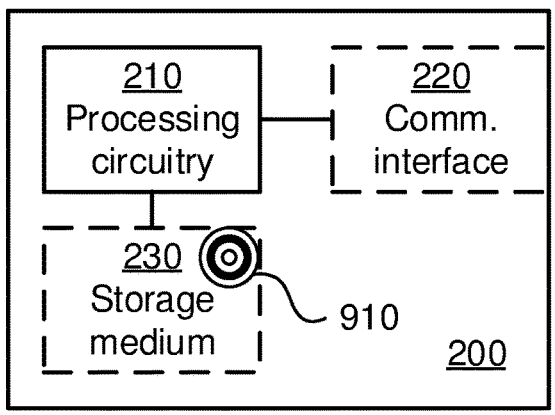
FIG. 7 is a schematic diagram showing functional units of a network node according to an embodiment.

FIG. 7 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, nodes, function, and devices, of the communications network 100 as well as entities, nodes, function, and devices served by the communications network 100. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 8:
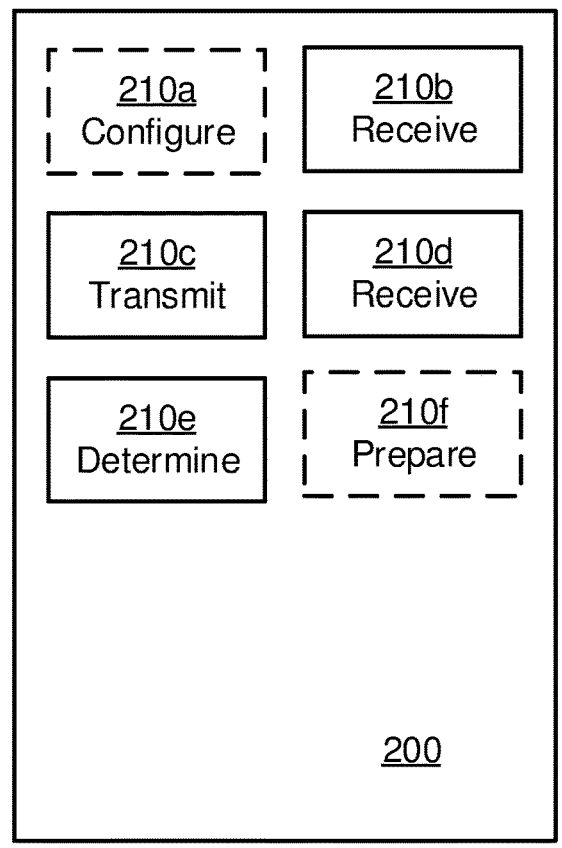
FIG. 8 is a schematic diagram showing functional modules of a network node according to an embodiment.

FIG. 8 schematically illustrates, in terms of a number of functional modules, the components of a network node 200 according to an embodiment. The network node 200 of FIG. 8 comprises a number of functional modules; a receive module 210b configured to perform step S104, a transmit module 210c configured to perform step S106 (and optional step S106'), a receive module 210d configured to perform step S108 (and optional step S108'), and a determine module 210e configured to perform step S110 (and optional step S110'). The network node 200 of FIG. 8 may further comprise a number of optional functional modules, such as any of a configure module 210a configured to perform optional step S102 and a prepare module 210f configured to perform optional step S110. In general terms, each functional module 210a-210f may in one embodiment be implemented only in hardware and in another embodiment with the help of software, i.e., the latter embodiment having computer program instructions stored on the storage medium 230 which when run on the processing circuitry makes the network node 200 perform the corresponding steps mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 210a-210f may be implemented by the processing circuitry 210, possibly in cooperation with the communications interface 220 and/or the storage medium 230. The processing circuitry 210 may thus be configured to from the storage medium 230 fetch instructions as provided by a functional module 210a-210f and to execute these instructions, thereby performing any steps as disclosed herein.

The network node 200 may be provided as a standalone device or as a part of at least one further device. For example, the network node 200 may be provided in a node of a radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the communication satellite than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 7 the processing circuitry 210 may be distributed among a plurality of devices, or nodes. The same applies to the functional modules 210a-210f of FIG. 8 and the computer program 920 of FIG. 9.

Figure 9:
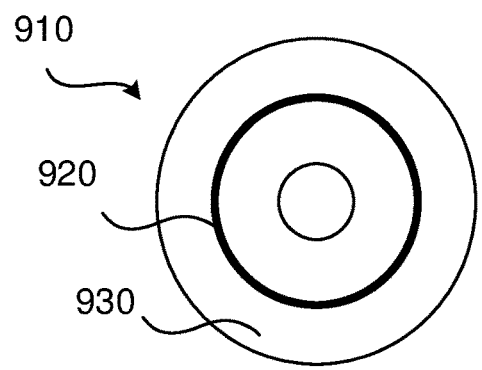
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 210 and thereto operatively coupled entities and devices, such as the communications interface 220 and the storage medium 230, to execute methods according to embodiments described herein. The computer program 920 and/or computer program product 910 may thus provide means for performing any steps as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

Figure 10:
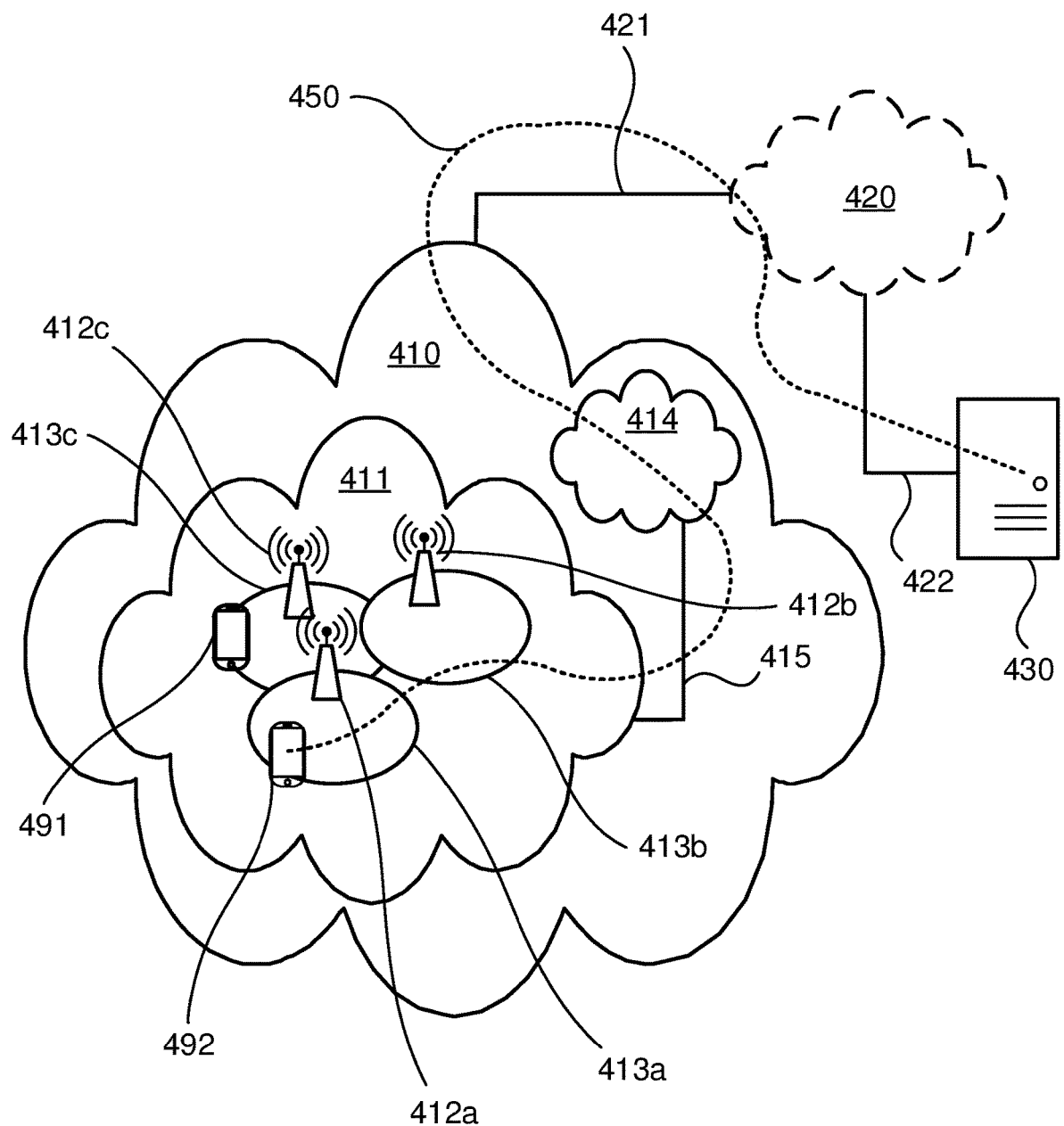
FIG. 10 is a schematic diagram illustrating a telecommunication network connected via an intermediate network to a host computer in accordance with some embodiments.

FIG. 10 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, such as radio access network 110 in FIG. 1, and core network 414, such as core network 120 in FIG. 1. Access network 411 comprises a plurality of radio access network nodes 412a, 412b, 412c, such as NBs, eNBs, gNBs (each corresponding to the network node 200 of FIG. 2) or other types of wireless access points, each defining a corresponding coverage area, or cell, 413a, 413b, 413c. Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the UE 150 of FIG. 2.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 11:
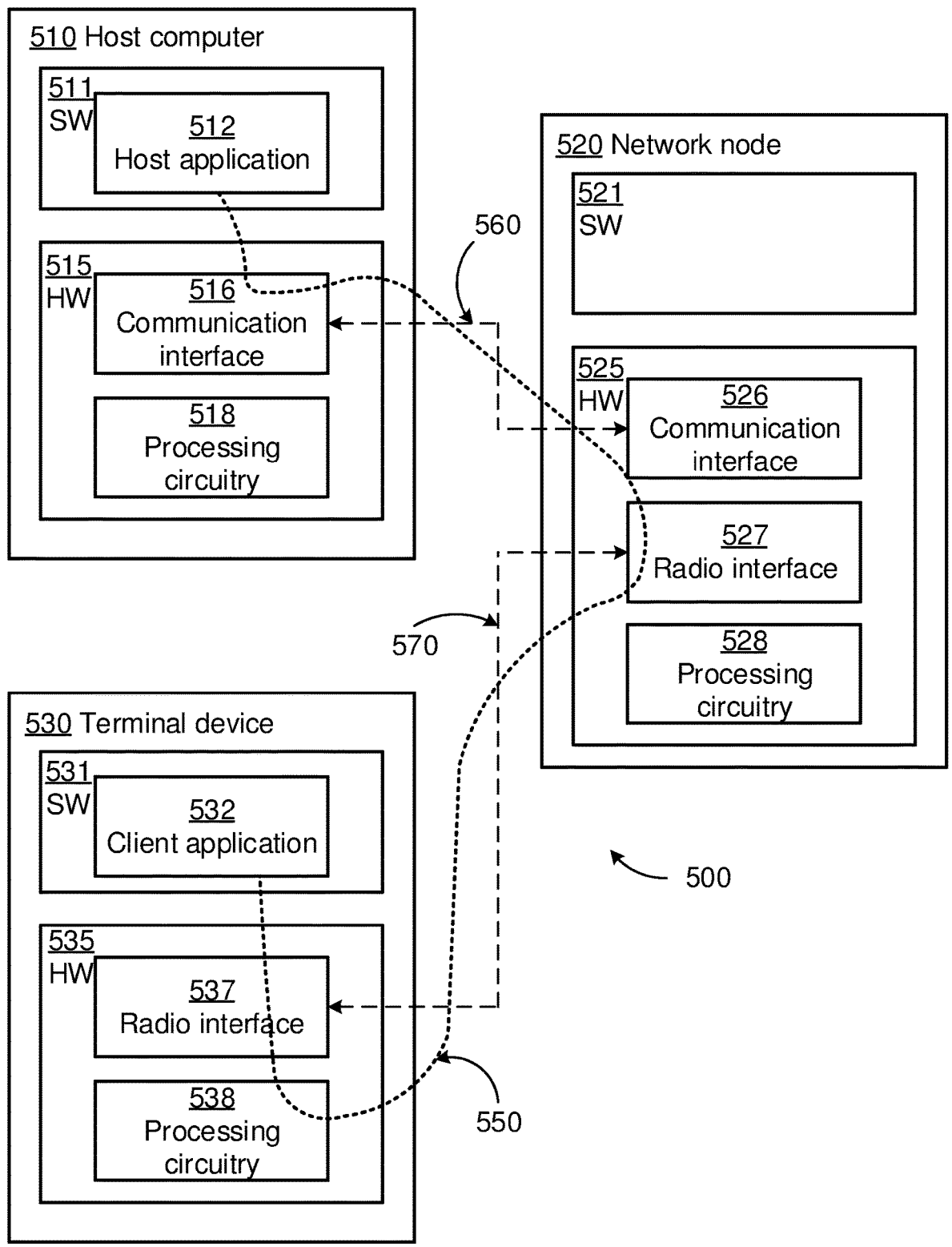
FIG. 11 is a schematic diagram illustrating host computer communicating via a radio base station with a terminal device over a partially wireless connection in accordance with some embodiments.

FIG. 11 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the UE 150 of FIG. 2. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the network node 200 of FIG. 2. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by radio access network node 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 11 may be similar or identical to host computer 430, one of network nodes 412a, 412b, 412c and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results.

The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for random access handling of a User Equipment (UE), the method being performed by a network node operative in a wireless communication network, the method comprising:
   receiving, from the UE during a first Random Access Opportunity (RAO), a first RA preamble, whilst refraining from responding to the first RA preamble;
   transmitting, towards the UE and without the network node first having received any retransmitted RA preamble from the UE, one Random Access Response (RAR) for each of N possible RA preambles, where each RAR comprises a Timing Advance (TA) command corresponding to a TA value estimated for the first RA preamble;
   receiving, from the UE during a further RAO, a retransmitted RA preamble; and
   determining whether or not the TA value for the retransmitted RA preamble matches the TA value for the first RA preamble.

2. The method according to claim 1, further comprising:
   configuring the UE to perform at least two RA preamble transmission attempts.

3. The method according to claim 1, wherein the RARs are transmitted at latest x subframes before end of a RAR window for the UE, where x is equal to half of the TA value estimated for the first RA preamble.

4. The method according to claim 1, further comprising, only upon having confirmed that the TA value for the retransmitted RA preamble matches the TA value for the first RA preamble:
   preparing for reception from the UE of a response to one of the RARs.

5. The method according to claim 1, wherein, when the TA value for the retransmitted RA preamble does not match the TA value for the first RA preamble, said transmitting, receiving, and determining are repeatedly performed for further retransmitted preambles, further TA values, and further RAOs, until a criterion is fulfilled.

6. The method according to claim 5, wherein the criterion is fulfilled by one of:
there is a match between two recent-most TA values; and
said transmitting, receiving, and determining have been repeatedly performed for a fixed number of iterations.

7. The method according to claim 1, wherein said transmitting, receiving, and determining are repeatedly performed by repeatedly:
transmitting, towards the UE and without the network node first having received any further retransmitted RA preamble from the UE, one RAR for each of the N possible RA preambles, where each RAR comprises a TA command corresponding to a TA value estimated for the retransmitted RA preamble;
receiving, from the UE and during a yet further RAO, a further retransmitted RA preamble; and
determining whether the TA value for the further retransmitted RA preamble matches the TA value for the retransmitted RA preamble or not.

8. The method according to claim 1, wherein N<64.
9. The method according to claim 8, wherein N≤32.
10. The method according to claim 9, wherein N≤16.
11. The method according to claim 10, wherein N≤8.
12. The method according to claim 11, wherein N=4.
13. The method according to claim 1, wherein the first RA preamble and the retransmitted RA preamble are received from the UE via a Non-Terrestrial Network (NTN) node.
14. The method according to claim 13, wherein the NTN node is an earth-orbiting communication satellite.
15. The method according to claim 1, wherein the RARs are transmitted towards the UE via a Non-Terrestrial Network (NTN) node.
16. The method according to claim 1, wherein all the RARs are transmitted in a common MAC PDU.
17. The method according to claim 1, wherein each RAR is indicated by a Random Access Preamble Identifier (RAPID) corresponding to one unique RA preamble among the N possible RA preambles.
18. A network node operative in a wireless communication network and configured for random access (RA) handling of a User Equipment (UE), the network node comprising processing circuitry, the processing circuitry being configured to cause the network node to:
receive, from the UE during a first Random Access Opportunity (RAO), a first RA preamble, whilst refraining from responding to the first RA preamble;
transmit, towards the UE and without the network node first having received any retransmitted RA preamble from the UE, one Random Access Response (RAR) for each of N possible RA preambles, where each RAR comprises a Timing Advance (TA) command corresponding to a TA value estimated for the first RA preamble;
receive, from the UE during a further RAO, a retransmitted RA preamble; and
determine whether or not the TA value for the retransmitted RA preamble matches the TA value for the first RA preamble.

19. The network node according to claim 18, wherein the processing circuitry is further configured to cause the network node to:
configure the UE to perform at least two RA preamble transmission attempts.

20. The network node according to claim 18, wherein the RARs are transmitted at latest x subframes before end of a RAR window for the UE, where x is equal to half of the TA value estimated for the first RA preamble.

21. The network node according to claim 18, wherein the processing circuitry is further configured to cause the network node to, only upon having confirmed that the TA value for the retransmitted RA preamble matches the TA value for the first RA preamble:
prepare for reception from the UE of a response to one of the RARs.

22. The network node according to claim 18, wherein, when the TA value for the retransmitted RA preamble does not match the TA value for the first RA preamble, said transmitting, receiving, and determining are repeatedly performed for further retransmitted preambles, further TA values, and further RAOs, until a criterion is fulfilled.

23. The network node according to claim 22, wherein the criterion is fulfilled by one of:
there is a match between two recent-most TA values; and
said transmitting, receiving, and determining have been repeatedly performed for a fixed number of iterations.

24. The network node according to claim 18, wherein said transmitting, receiving, and determining are repeatedly performed by repeatedly:
transmitting, towards the UE and without the network node first having received any further retransmitted RA preamble from the UE, one RAR for each of the N possible RA preambles, where each RAR comprises a TA command corresponding to a TA value estimated for the retransmitted RA preamble;
receiving, from the UE and during a yet further RAO, a further retransmitted RA preamble; and
determining whether the TA value for the further retransmitted RA preamble matches the TA value for the retransmitted RA preamble or not.

25. The network node according to claim 18, wherein N<64.
26. The network node according to claim 25, wherein N≤32.
27. The network node according to claim 26, wherein N≤16.
28. The network node according to claim 27, wherein N≤8.
29. The network node according to claim 28, wherein N=4.
30. The network node according to claim 18, wherein the first RA preamble and the retransmitted RA preamble are received from the UE via a Non-Terrestrial Network (NTN) node.
31. The network node according to claim 30, wherein the NTN node is an earth-orbiting communication satellite.
32. The network node according to claim 18, wherein the RARs are transmitted towards the UE via a Non-Terrestrial Network (NTN) node.
33. The network node according to claim 18, wherein all the RARs are transmitted in a common MAC PDU.
34. The network node according to claim 18, wherein each RAR is indicated by a Random Access Preamble Identifier (RAPID) corresponding to one unique RA preamble among the N possible RA preambles.
35. A network node operative in a wireless communication network and configured for random access (RA) handling of a User Equipment (UE), the network node comprising:
receive circuitry configured to receive, from the UE during a first Random Access Opportunity (RAO), a first RA preamble, whilst refraining from responding to the first RA preamble;

transmit circuitry configured to transmit, towards the UE and without the network node first having received any retransmitted RA preamble from the UE, one Random Access Response (RAR) for each of N possible RA preambles, where each RAR comprises a Timing Advance (TA) command corresponding to a TA value estimated for the first RA preamble;

receive circuitry configured to receive, from the UE during a further RAO, a retransmitted RA preamble; and determine circuitry configured to determine whether the TA value for the retransmitted RA preamble matches the TA value for the first RA preamble or not.

36. A non-transitory computer readable medium storing a computer program for random access (RA) handling of a User Equipment (UE), the computer program comprising computer code which, when run on processing circuitry of a network node operative in a wireless communication network, causes the network node to:

receive, from the UE during a first Random Access Opportunity (RAO), a first RA preamble, whilst refraining from responding to the first RA preamble;

transmit, towards the UE and without the network node first having received any retransmitted RA preamble from the UE, one Random Access Response (RAR) for each of N possible RA preambles, where each RAR comprises a Timing Advance (TA) command corresponding to a TA value estimated for the first RA preamble;

receive, from the UE during a further RAO, a retransmitted RA preamble; and determine whether the TA value for the retransmitted RA preamble matches the TA value for the first RA preamble or not.

* * * * *